April 29, 1969 D. R. BENNETT 3,441,874

SWEEP GENERATOR

Filed June 30, 1966 Sheet 1 of 2

INVENTOR.
DONALD R. BENNETT

BY John F. Lawler
ATTORNEY

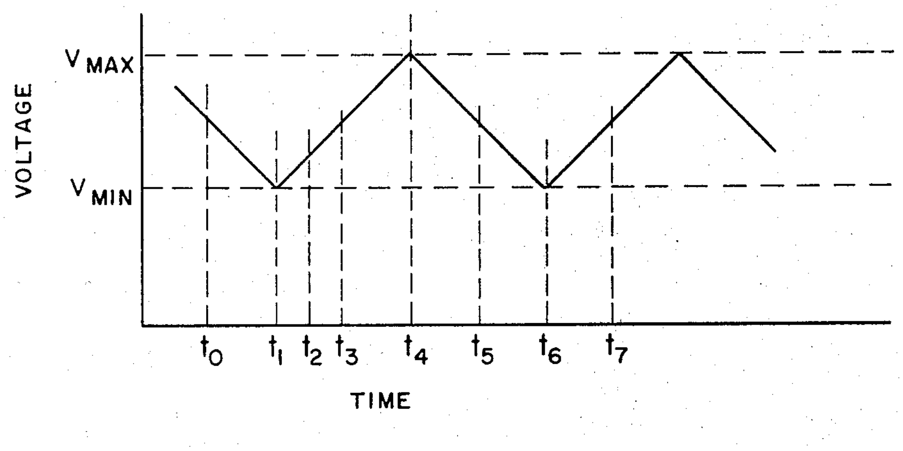
FIG-2-A
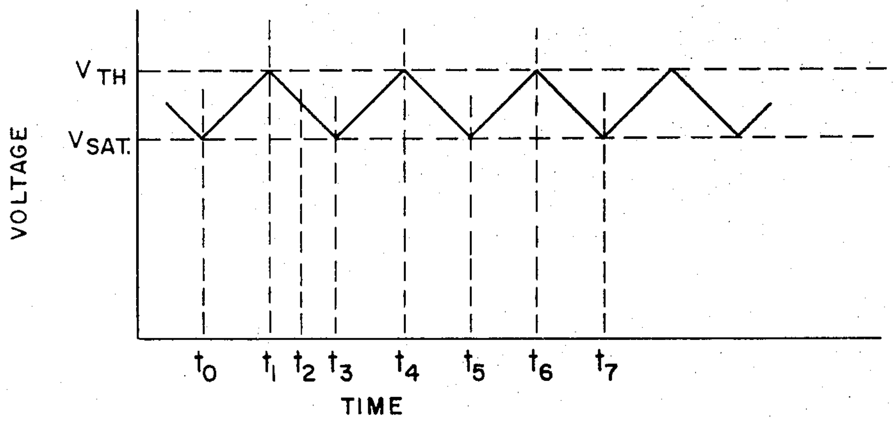
FIG-2-B
INVENTOR.
DONALD R. BENNETT
BY John F. Lawler
ATTORNEY 3,441,874
SWEEP GENERATOR Donald R. Bennett, Los Gatos, Calif., assignor to Sylvania Electric Products Inc., a corporation of Delaware Filed June 30, 1966, Ser. No. 561,787
Int. Cl. H02h *1/04*
U.S. Cl. 331—111 8 Claims

ABSTRACT OF THE DISCLOSURE

This generator includes a sweep circuit producing a sawtooth sweep voltage varying between upper and lower limits, a transistor amplifier responsive to the sweep voltage for alternately operating in the active and saturation region, and a unijunction transistor threshold circuit. The amplifier operates in the saturation region producing an output voltage proportional to the sweep voltage and equal to the threshold voltage when the sweep voltage is at its upper limit. The amplifier operates in the active region producing an output voltage inversely proportional to the sweep voltage and equal to the threshold voltage when the sweep voltage is at its lower limit. The sweep circuit is response to operation of the unijunction for changing the slope of the sweep voltage each time it reaches one of its limits.

Figure 1:
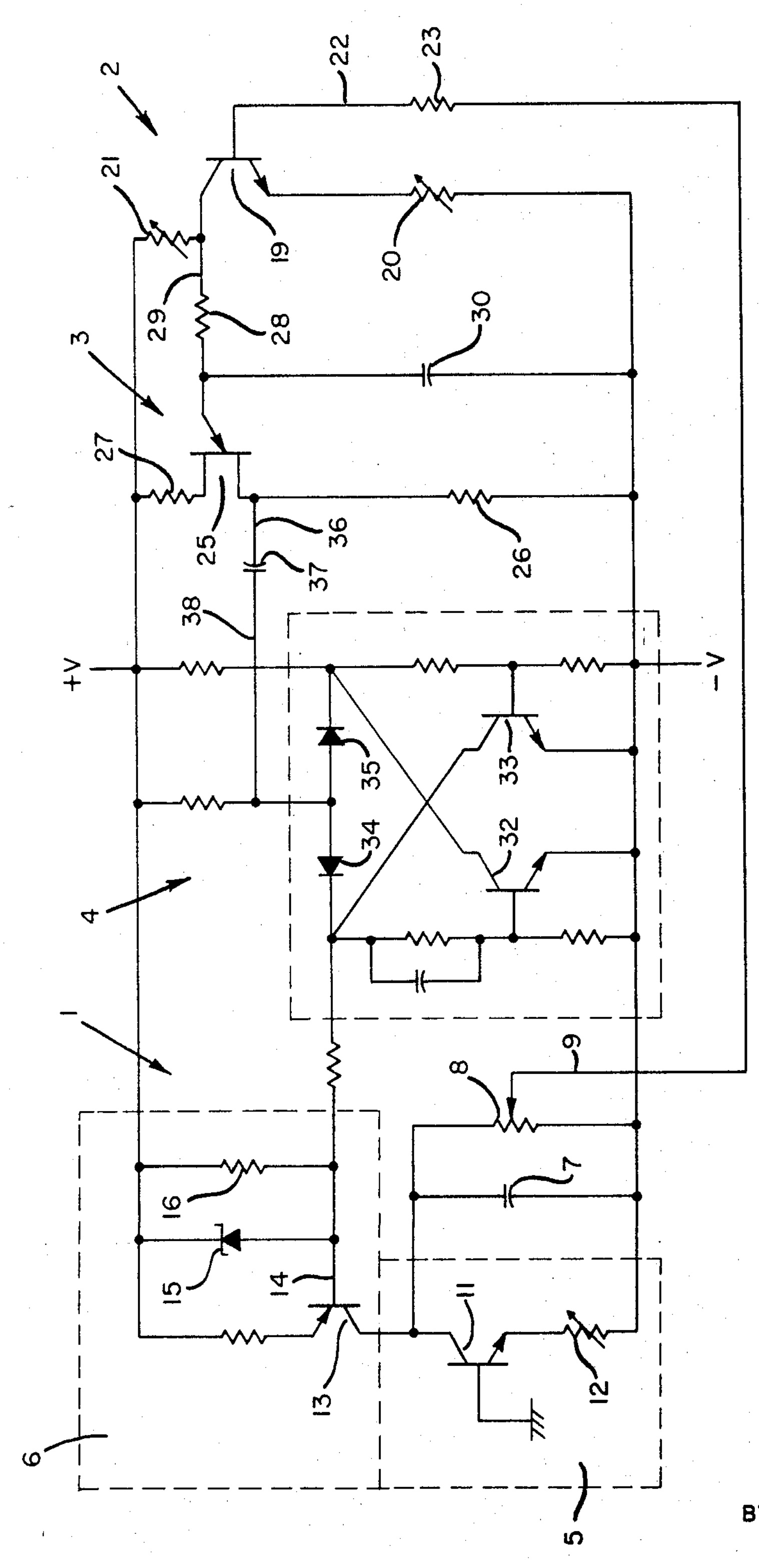

This invention relates ot sweep generators and more particularly to an improved threshold detector circuit in a sweep generator for sensing both the upper and the lower voltage limits of a sweep signal.

In certain equipment such as electronically tuned receivers, sweep generators are employed to produce sweep voltages which have upper and lower voltage limits, both of which are adjustable. It is necessary in such equipment to determine when the sweep voltage reaches these upper and lower limits in order to control the slope of the sweep voltage. The present practice for doing this is to employ two threshold detector circuits—one to detect when the magnitude of the sweep voltage is equal to the lower limit and the other to detect when the magnitude of the sweep voltage is equal to the upper limit.

An object of this invention is the provision of a sweep generator having a single threshold detector circuit for sensing both the upper and the lower limits of a sweep signal.

Another object is the provision of a threshold detector circuit which switches operating states when the magnitude of an incident signal crosses an upper limit or a lower limit.

Briefly, an embodiment of this invention comprises a sweep signal source, a transistor amplifier which is responsive to the sweep signal for operating in both the active and saturation regions of the transistor, and a threshold or switching device which is responsive to the amplifier output. The amplifier is biased to operate in the active region and has an output voltage equal to the threshold level of the switching device when the sweep signal is at its lower voltage limit. As the sweep signal voltage increases, the output of the amplifier decreases until the latter goes into saturation at which time the amplifier output increases. The amplifier is biased to operate in the saturation region and has an output equal to the threshold level of the switching device when the sweep signal voltage is at the upper limit. The output of the switching device is applied to the sweep source to control the sweep signal.

This invention will be more fully understood from the following detailed description of a preferred embodiment thereof together with the accompanying drawings in which:

FIGURE 1 is a schematic circuit diagram of a sweep generator incorporating this invention; and FIGURES 2A and 2B are waveforms showing circuit performance wherein FIGURE 2A represents a triangular sweep voltage and FIGURE 2B represents the output voltage of a common emitter transistor amplifier.

Referring to FIGURE 1, the sweep generator comprises a source 1 of sweep voltage, a common emitter transistor amplifier 2, a unijunction transistor threshold detector 3, and a steering circuit 4. Source 1 comprises first and second current generators 5 and 6, respectively, sweep capacitor 7, and potentiometer 8. The sweep voltage developed across capacitor 7 is a triangular waveform which varies linearly from a lower voltage level $V_{min}$ to an upper voltage level $V_{max}$ and is represented by the waveform of FIGURE 2A. Potentiometer 8 provides control of the magnitude of the sweep voltage coupled from the sweep source on line 9.

The first current generator 5 comprises transistor 11 and potentiometer or variable resistor 12 connected in parallel with capacitor 7. Transistor 11 at all times is biased to conduct for discharging capacitor 7 at a constant rate. Potentiometer 12 controls the rate of conduction of transistor 11 and thus the rate of discharge of capacitor 7 and the slope of the sweep voltage.

The second current generator 6 comprises transistor 13 which conducts to charge capacitor 7 during alternate half-cycles of the sweep signal (e.g., between time $t_1$ and $t_4$, see FIGURE 2A). A signal on line 14 from circuit 4 controls conduction of transistor 13. Zener diode 15 is electrically connected between the base and emitter electrodes of transistor 13 to cause the current output thereof to be constant. Resistor 16 biases the output current of transistor 13 to zero when the transistor is cut off. Current generator 6 is designed to have an output twice that of current generator 5 so that the absolute value of the rate of change of the sweep voltage developed by capacitor 7 is at all times constant.

Amplifier 2 comprises a transistor 19 having an emitter electrode resistively coupled through variable resistor or potentiometer 20 to the source of voltage —V and a collector electrode resistively coupled through variable resistor or potentiometer 21 to the source of voltage +V. The base electrode of transistor 19 is resistively coupled through resistor 23 and line 22 to the tap of potentiometer 8.

Detector 3 comprises a unijunction transistor 25 having a first base electrode resistively coupled through resistor 26 to the source of voltage —V and a second base electrode resistively coupled through resistor 27 to the source of voltage +V. The emitter electrode of the unijunction is resistively coupled through resistor 28 to the collector electrode of transistor 19 and is capacitively coupled through capacitor 30 to the source of voltage —V. Resistor 28 and capacitor 30 comprises an integrator which sums the output of amplifier 2. When the signal stored by capacitor 30 exceeds the emitter-first base junction breakdown voltage, the unijunction conducts and discharges capacitor 30 through potentiometer 26 to produce a positive pulse output voltage.

Transistor 19 is responsive to the sweep signal on line 22 for operating in its active region during part of one cycle of the sweep voltage and for operating in its saturation region during the remainder of the cycle of the sweep voltage. When transistor 19 is operating in its active region, the output voltage on line 29 is inversely proportional to the base drive sweep voltage on line 22, see FIGURE 2, time $t_0$ to $t_3$. When transistor 19 is operating in its saturation region, however, the slope of the output voltage on line 29 reverses and the output voltage is directly proportional to and substantially equal to the base drive sweep voltage on line 22, see FIGURE 2, time $t_3$ to $t_5$. This invention takes advantage of this operation of a transistor in the saturation region in accomplishing the objects of this invention.

The resistance of potentiometer 8 is adjusted to bias transistor 19 to operate in its active region and to have an output voltage on line 29 which is equal to the breakdown voltage of the unijunction when the base drive sweep voltage on line 22 is equal to the lower voltage limit $V_{min}$, see FIGURE 2, time $t_1$. The resistances of potentiometers 20 and 21 are adjusted to bias transistor 19 to operate in the saturation region and have an output voltage on line 29 which is equal to the breakdown voltage of the unijunction when the base drive sweep voltage on line 22 is equal to the upper voltage limit $V_{max}$, see FIGURE 2, time $t_4$.

Steering circuit 4 is a collector coupled bistable multivibrator comprising transistors 32 and 33 and steering diodes 34 and 35. The output of the unijunction is capacitively coupled through capacitor 37 and steering diodes 34 and 35 to the base electrodes of transistors 32 and 33, respectively, to control conduction thereof. The output voltage from the collector electrode of transistor 33 is the voltage applied on line 14 to control conduction of transistor 13.

In operation at time $t_2$, see FIGURE 2, transistor 33 is conducting and a negative voltage on line 14 biases transistor 13 to conduct. Since the conduction rate of transistor 13 is twice the conduction rate of transistor 11, the second current generator 6 charges capacitor 7 at a constant rate.

Amplifier 2 is responsive to the sweep voltage on line 22 which biases transistor 19 to operate in the active region such that the output voltage on line 29 is inversely proportional to the sweep voltage, see FIGURE 2B, time $t_2$. As the magnitude of the sweep voltage increases (becomes more positive), the magnitude of the output voltage on line 29 decreases until the base and collector voltages of transistor 19 are equal at time $t_3$ and transistor 19 is in saturation. As the magnitude of the sweep voltage continues to increase, the magnitude of the output voltage of transistor 19 also increases. When the sweep voltage is equal to the upper voltage limit $V_{max}$, see FIGURE 2A, time $t_4$, the output voltage on line 29 is equal to the breakdown voltage of unijunction transistor 25 and the unijunction conducts to discharge capacitor 30 through resistor 26 and produce an output voltage pulse on line 36.

The voltage pulse on line 38 biases steering diode 34 and transistor 32 to conduct and cause the multivibrator to change operating states so that transistor 33 is cut off. This change in operation of transistor 33 causes a positive voltage to be applied on line 14 to cut off transistor 13. Thus, at time $t_4$, conduction of transistor 11 causes capacitor 7 to discharge at a constant rate and the slope of the sweep voltage to reverse.

Since amplifier 2 is still operating in the saturation region, the output voltage on line 29 is directly proportional to the sweep voltage on line 22 until transistor 19 comes out of saturation and operates in the active region at time $t_5$. As the magnitude of the sweep voltage continues to decrease (to become less positive), the magnitude of the output voltage of transistor 19 increases. When the magnitude of the sweep voltage is equal to the lower voltage limit $V_{min}$ at time $t_6$, the output voltage on line 29 is again equal to the breakdown voltage of the unijunction. Conduction of the unijunction discharges capacitor 30 through resistor 26 to generate a positive output pulse on line 36.

The voltage pulse on line 38 biases steering diode 35 to conduct and bias the multivibrator to again change operating states, cutting off transistor 32 and causing transistor 33 to conduct. Conduction of transistor 33 causes a negative voltage to again be applied on line 14 to bias transistor 13 to conduct. Conduction of transistor 13 causes the slope of the sweep voltage to again reverse at time $t_6$, and the second current generator 6 to charge capacitor 7 at a constant rate. The sweep generator continues to operate in the manner previously described.

Although this invention is described in relation to a specific embodiment thereof, variations and modifications will be apparent to those skilled in the art. The scope of the invention is therefore determined by the following claims.

I claim:

1. A threshold sensing circuit comprising an electronic device having first and second operating states and being responsive to a signal having a characteristic which has a magnitude and slope that vary, said electronic device in the first operating state producing an output which varies inversely with changes in the magnitude of the signal characteristic and in the second operating state producing an output which varies proportionally with changes in magnitude of the signal characteristic, the magnitudes of said electronic device output being equal when the signal magnitude is equal to a minimum limit and a maximum limit, a threshold device having first and second operating states responsive to the output of said electronic device for switching the operating states of said threshold device whereby to generate an output when the magnitude of the signal is equal to the maximum or the minimum limit, and utilization means responsive to the output of said threshold device and comprising a control circuit responsive to the output of said threshold device for changing the slope of the signal characteristic when the magnitude of the signal is equal to the maximum and the minimum light.

2. The threshold sensing circuit according to claim 1 in which said electronic device comprises a transistor, and including first means for biasing said transistor to operate in its active region corresponding to said first operating state when the magnitude of the signal is closer to one of the limits than the other, and second means for biasing said transistor to operate in saturation corresponding to said second operating state when the magnitude of the signal is closer to said other of the limits than said one limit thereof.

3. The threshold sensing circuit according to claim 2 wherein said transistor has first, second, and third terminals, said first terminal being electrically connected to a voltage source, said second terminal being electrically connected to a reference voltage, and said third terminal being connected to said utilization circuit.

4. The threshold sensing circuit according to claim 3 wherein said threshold device comprises a unijunction transistor having two base terminals and an emitter terminal, one of said base terminals being electrically connected to the reference voltage, the other of said base terminals being electrically connected to said voltage source, and said emitter terminal being electrically connected to the first terminal of said first-named transistor, said unijunction transistor being operative to switch operating states and reverse the slope of the signal characteristic when the voltage on said first terminal of said first-named transistor is equal to the breakdown voltage of said unijunction.

5. The threshold sensing circuit according to claim 4 including a current limiting resistor electrically connected between said one of the base terminals of said unijunction transistor and the reference voltage and including an integrating capacitor electrically connected between the emitter terminal of said unijunction transistor and the reference voltage, said integrating capacitor discharging through said current limiting resistor during condition of said unijunction transistor.

6. The threshold sensing circuit according to claim 1 wherein the signal is a sweep signal varying in magnitude between minimum and maximum limits and said control circuit comprises a sweep signal source for generating the sweep signal, said source comprising a sweep capacitor, a first current generator electrically connected to said sweep capacitor for discharging said sweep capacitor at all times at a constant rate, and a second current generator electrically connected to said sweep capacitor and having a conduction rate which is twice the conduction rate of said first current generator, said second current generator conducting and charging said sweep capacitor only during alternate half-cycles of the sweep signal, first means coupling the sweep signal generated by said sweep capacitor to said electronic device, and second means coupling the output of said threshold device to said second current generator for controlling operation thereof.

7. The threshold sensing circuit according to claim 6 including third means for varying the bias on said electronic device to vary the gain and adjust the magnitude of the output thereof, and fourth means for adjusting the magnitude of the sweep signal coupled from said sweep capacitor to said electronic device for biasing said elctrnonic device.

8. The threshold sensing circuit according to claim 5 wherein the signal is a sweep voltage varying between minimum and maximum limits and said ultilization means comprises a sweep voltage source for generating the sweep voltage, said sweep voltage source comprising a sweep capacitor having a first terminal connected to the reference voltage and having a second terminal a potentiometer electrically connected in parallel with said sweep capacitor and having a wiper arm electrically connected to the third terminal which is the base electrode of said first-named transistor, a first current generator comprising a third transistor having base and emitter electrodes electrically connected to the reference voltage and having a collector electrode electrically connected to the second terminal of said sweep capacitor, said third transistor conducting at all times to discharge said sweep capacitor at a constant rate, and a second current generator comprising a Zener diode and a fourth transistor having a collector electrode electrically connected to the second terminal of said sweep capacitor and having base and emitter electrodes, said Zener diode being electrically connected between the base and emitter electrodes for maintaining constant the current output of said fourth transistor during conduction thereof, a steering circuit having input and output terminals and comprising a bistable multivibrator including two active elements and a steering diode associated with each of the active elements of said multivibrator, said input terminal being electrically connected to the said one of the base terminals of said unijunction transistor for coupling the output thereof to said multivibrator and controlling conduction of the active elements thereof, the output terminal of said steering circuit being electrically connected to the base electrode of said fourth transistor for biasing said fourth transistor to conduct during alternate half-cycles of the sweep voltage and charge said sweep capacitor at the constant rate, said first biasing means comprising a variable resistor associated with said first-named transistor whereby the gain of the latter is varied.

References Cited

UNITED STATES PATENTS

| | | | |
|---|---|---|---|
| 3,098,936 | 7/1963 | Isabeau | 307—237 |
| 3,240,953 | 3/1966 | Hekimian et al. | 307—237 |

ARTHUR GAUSS, *Primary Examiner.*

JOHN ZAZWORSKY, *Assistant Examiner.*

U.S. Cl. X.R.

307—228; 328—183, 185